April 12, 1927.
A. J. GRAHAM ET AL
1,624,232
LINE SPOOLER
Filed Jan. 19, 1926
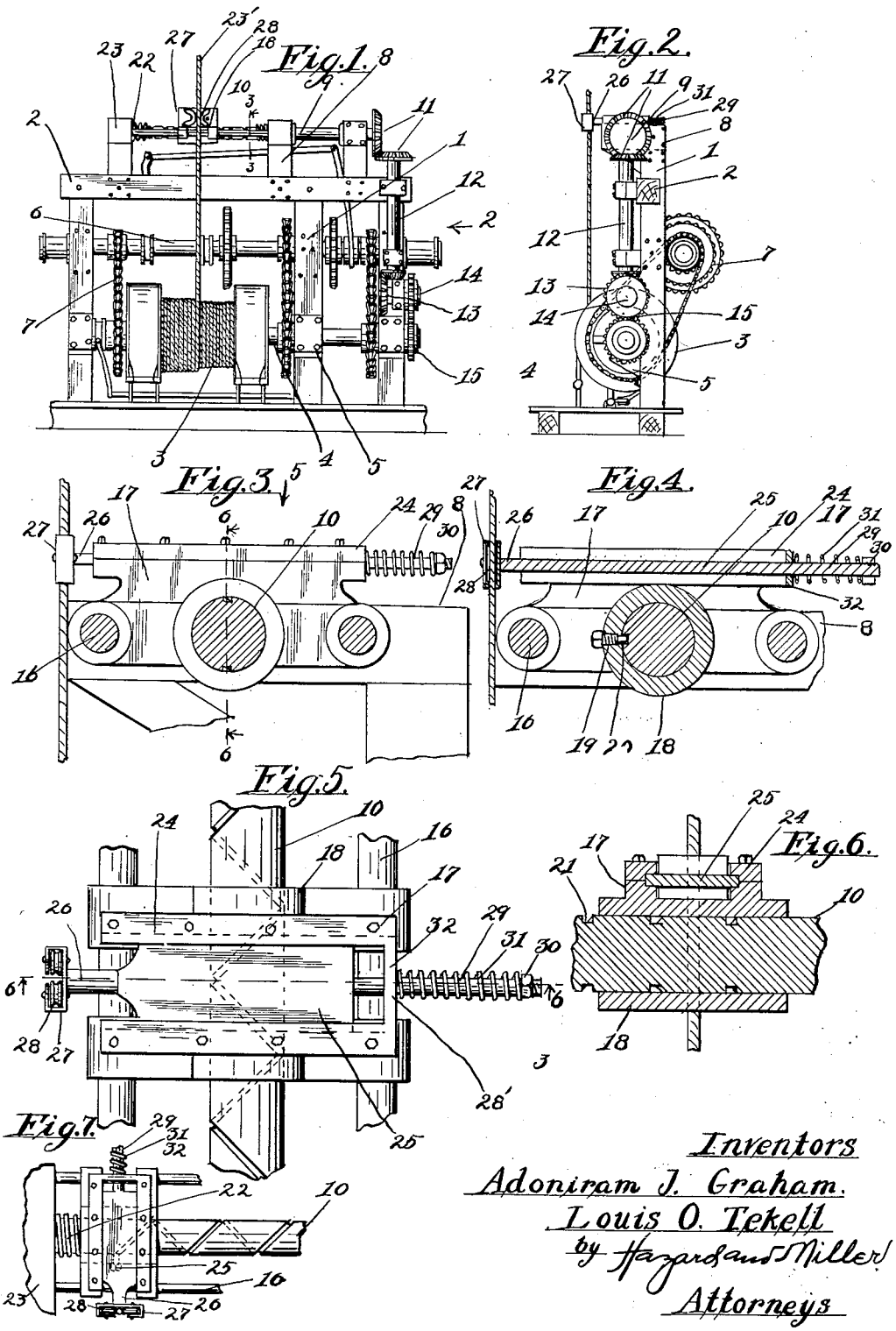
Inventors
Adoniram J. Graham.
Louis O. Tekell
by Hazard and Miller
Attorneys Patented Apr. 12, 1927.

1,624,232

UNITED STATES PATENT OFFICE.

ADONIRAM J. GRAHAM AND LOUIS O. TEKELL, OF WHITTIER, CALIFORNIA, ASSIGNORS TO GRA-KELL LINE-SPOOLER COMPANY, OF LOS ANGELES, CALIFORNIA, A PARTNERSHIP COMPOSED OF ADONIRAM J. GRAHAM, LOUIS O. TEKELL, HARRY MAXWELL, HARRY P. DAVIS, J. E. WALLIS, A. R. CHANDLER, CHARLES T. BUTLER, AND DAVID H. CANNON.

LINE SPOOLER.

Application filed January 19, 1926. Serial No. 82,225.

Our invention is a line spooler for guiding a line of rope or the like in being wound on a drum.

An object of our invention is to provide a line spooler suitable for guiding the rope or cable line of a drilling machine or the like as it is wound on a drum, the spooler causing the traversing of the line lengthwise of the drum or spool and reversing its direction at opposite ends.

Another object of our invention is to form a resilient abutting device for the line engaging holders so that the holders may contact with the resilient abutment and receive a back impulse at each end of its stroke.

A further object of our invention is to guide the rope laterally on the drum as the diameter increases and decreases due to the winding on and off of the line or rope.

In our construction of line spooler we utilize a more or less standard type of drive for a drum or spool and mount a rope guiding device on a rod or track parallel to the drum and cause the traversing of the guide by means of the reverse threads on a screw, the screw being driven by gearing from the drive mechanism for the spool.

At each end of the stroke of the line guide springs slow up and stop the movement in conjunction with the reverse threads and give a return impulse as the line or rope in being wound reaches the opposite ends of the spool. The line guide is also resiliently mounted in order to guide the line in a straight direction as the diameter of the spool increases and decreases due to increased or decreased windings the action being automatic by means of a spring under constant tension.

Our invention will be more readily understood from the following description and drawings, in which;

Figure 1 is a front elevation of a line reeling device having our spooling attachment mounted thereabove.

Fig. 2 is an end elevation taken in the direction of the arrow 2 of Fig. 1.

Fig. 3 is a cross section on the line 3—3 of Fig. 1, in the direction of the arrows.

Fig. 4 is a cross section on the line 4—4 of Fig. 1.

Fig. 5 is a plan view of the detail of Fig. 3 in the direction of the arrow 5.

Fig. 6 is a detail cross section on the line 6—6 of Fig. 3, taken in the direction of the arrow.

Fig. 7 is a detail plan similar to Fig. 5 on a smaller scale, indicating the action of the abutment springs.

The general type of reeling device to which our spooler is attached is indicated in Fig. 1, in which a series of posts 1 with a cross rail 2 connected thereto form a mounting for a reeling drum 3, this latter being mounted on a shaft 4 rotatable in journals 5 on the posts. A counter-shaft 6 is also supported in journals mounted on the posts and a system of sprocket chain gearing 7 is utilized to rotate the drum from the counter-shaft. The drum is provided with the usual brake mechanism which is not, however, a feature of our invention.

A spooling frame 8 is mounted on the cross rail and has journals for a spooling shaft 9; this shaft having an extension forming a spooling screw 10. The spooling shaft is driven by double bevel gears 11, one of which is mounted on a vertical shaft 12, this latter having a double set of bevel gears 13 forming a connection with a stub shaft 14, the latter being driven through intermeshing gears 15, one of which is on the axle shaft 4. Thus the spooling shaft is driven with the drum shaft.

The spooling device is indicated particularly in Figs. 3 to 7 and is mounted on a pair of supporting tracks 16, these being rods supported in the spooling frame 8. A guide block designated generally by the numeral 17 is mounted on the rails 16 and has a hub 18 through which the spooling screw 10 passes. A set screw 19 having a bearing end 20 is adapted to engage in the threads 21 cut on the spooling screw. These are reversing threads and in the continuous rotation of the spooling screw carry the guide block from one end to the other of the spool and reverse its direction due to the reversal of the screw threads at the end of the screw.

A pair of springs 22 are coiled around the ends of the spooling screw and rest against the abutment ends 23 of the spooling frame. Therefore, when the guide block reaches the end of its stroke it engages either one spring or the other as indicated in Fig. 7 and compresses the spring. This therefore retards the traversing of the guide block and gives it an initial impulse on the return stroke, the stroke being carried on by the interengagement of the set screw 19 and the threads on the spooling screw. It will thus be seen that the line 23' is smoothly traversed from one end to the other of the reeling drum and smoothly reversed at the end of each traverse.

The lateral guide for the line to compensate for the change in diameter of the reel is substantially as follows:

The guide block is provided with a slideway 24 on which is mounted a slide block 25 having an extension bar 26 at the front end, on which is secured a roller frame 27 having a pair of rollers 28 therein, these rollers being grooved to engage opposite sides of the line.

The rear end of the guide block is provided with an aperture 28' through which a tail rod 29 rigidly connected to the slide block may operate. This tail rod has a nut 30 at its outer end and a compression spring 31 between the abutment bar 32 of the guide block and the nut 30. Therefore the action of the spring is to place a constant tension on the line as it is being reeled, throwing it inwardly, that is, towards the reel or drum. This action is constant while the line is being traversed on the reeling drum and manifestly as the reeling periphery becomes greater due to the increased diameter, the inward tension also becomes greater, thus holding the line in a snug fit on the underneath coils of line and on the drum.

A particular feature of our invention is in the driving of the spooling shaft 9 and hence the spooling screw 10 by an operatively geared connection from the drum shaft or axle 4. This drum shaft as above mentioned is driven by the sprocket gearing 7, there being three sets of chains and sprockets giving three different speeds, the driving being from the countershaft 6, sometimes called the line shaft, such shaft being driven in any suitable manner from an engine or the like.

Therefore, no matter at what speed the drum is driven the spooling device is operated in a direct predetermined ratio therewith so that the traversing of the guide block with the rollers engaging the line is a positive drive, independent of any frictional connection with the line.

The gearing connection we have shown from the drum shaft may be varied to suit special circumstances retaining however, the essential feature of the drive being from the drum shaft or in a predetermined ratio to the speed of such shaft.

From the above description it will be apparent that our line spooler device is of relatively simple construction and accomplishes three different functions of traversing the line on the drum, positively aiding the return stroke of the guide block and guiding the line by means of a slide block as the reeling diameter of the drum increases and decreases.

Although we have illustrated our line spooler as being applied to a standard type of reeling drum mechanism as in more or less common use in oil well work, it is to be understood that our invention may be adapted to other spooling purposes.

Therefore, changes may be made in the general construction and in specific details without departing from the spirit of our invention as set forth in the description, drawings and claims.

Having described our invention, what we claim is:

1. A line spooler comprising in combination a rotatable drum adapted to reel a line thereon, a spooling device having means engaging a line, means to traverse the engaging means lengthwise of the drum and resilient means mounted at the end of travel of the engaging means to give a return impulse and a slide to cause the engaging means to follow the line as the winding diameter of the drum increases and decreases due to the winding of the line.

2. A line spooler comprising in combination a rotatable drum for winding a line, a guide block, means to traverse the guide block longitudinally of the drum, resilient means at the end of each traverse to engage the block and give a return impulse and a slide block having means engaging a line to follow the line on increase and decrease of the winding diameter of the drum.

3. A line spooler comprising in combination a reeling drum, a spooling device having a rotating spooling screw with reverse threads, a guide block engaging said threads, resilient means at the end of the spooling screw to engage the guide block and a slide having rollers engaging the line, the said rollers following the line as the reeling surface of the drum increases and decreases due to the winding and unwinding of the line.

4. A line spooler as claimed in claim 3, in which the slide block is provided with a resilient mounting, the mounting pressing the slide block constantly inwardly.

5. A line spooler comprising in combination a reel drum, a spooling device having a shaft, a screw in alinement therewith having reverse threads, guide rocks, a guide block slidably mounted on the rods and being operatively connected to the screw to be reversed thereby, coil springs mounted on the ends of the screw to engage the guide block at the end of each traverse, rollers mounted on a slide block in the guide block to engage a line.

6. A line spooler as claimed in claim 5, the slide block having a spring operatively connected therewith constantly pressing the guide block and hence drawing the rollers inwardly.

7. A line spooler comprising in combination a drum supporting frame, a reeling drum mounted therein, a spooling frame supported on the drum frame having a spooling shaft parallel to the drum axle, a screw in alinement with the said shaft having reverse threads, a pair of springs mounted in opposite ends of said screw, the spooling frame having abutment ends against which the springs bear, a pair of guide rods parallel to the screw, a guide block having a hub slidably mounted on the rods, the hub being operatively connected to the screw, rollers mounted on a slide block in the guide block to engage a line, and means to rotate the drum and spooling shaft in unison.

8. A line spooler as claimed in claim 7, the said slide block having a tail rod and a compression spring operatively mounted between the said rod and the guide block.

9. In a line spooler, a reeling drum suitably mounted, a spooling frame having a shaft and a spooling screw, a guide block operatively connected to the said screw, and rollers mounted on a slide block in the guide block to engage a line.

10. In a line spooler, a reeling drum, a spooling screw having reverse threads, a guide block engaging said threads and slidable longitudinally of the drum, a slide block sliding transversely of the screw and means operatively connecting the slide block to a line adapted to guide the line.

11. In a line spooler as claimed in claim 10, in which the slide block is provided with a resilient mounting, the mounting constantly pressing the slide block inwardly.

12. In a line spooler, a reeling drum, a spooling screw having reverse threads, a guide block engaging said threads and sliding longitudinally with the drum, a slide block sliding transversely of the screw, means operatively connecting the slide block to a line adapted to guide such line, means to guide the drum, and a positive driving connection from the drum to the spooling screw.

13. In a line spooler, a reeling drum, a spooling screw having reverse threads, a guide block engaging said threads and slidable longitudinally of the drum, a slide block sliding transversely of the screw, said block having a resilient mounting, the mounting constantly pressing the slide block in one direction, means operatively connecting the slide block to a line adapted to guide such line, means to positively drive the drum, and means to drive the spooling screw from the drum.

In testimony whereof we have signed our names to this specification.

ADONIRAM J. GRAHAM.
L. O. TEKELL.